3,243,465
PROCESS OF PURIFYING GLYCERIN
Francis Weiss and Raymond Rusch, Pierre-Benite, Rhone, France, assignors to Societe d'Electro-Chimie, d'Electro-Metallurgie et des Acieres Electriques d'Ugine, Paris, France, a corporation of France
No Drawing. Filed Mar. 20, 1962, Ser. No. 181,203
Claims priority, application France, Mar. 24, 1961, 856,666; Sept. 1, 1961, 872,094
6 Claims. (Cl. 260—637)

The present invention relates to a process of purifying synthetic glycerin by catalytic hydrogenation.

The production of glycerin by hydroxylation of allylalcohol by means of hydrogen peroxide in the presence of mineral catalysts, such at tungstic acid, molybdic acid or their derivatives, or of organic catalysts, such as formic acid, is already well known. But the thus obtained glycerin is not suitable for use where a high degree of purity is required.

The quality of commercial glycerin is evaluated according to its physical characteristics: color, density, stability, etc., as well as its behavior in different tests intended to check its purity and its ability to be used for certain applications. Amongst these tests, the most difficult to be complied with are those imposed by the manufacturers of polyester resins and by the American Codex, and more particularly:

The potassium permanganate test
The heat test
The concentrated sulphuric acid test which are described hereafter:

(1) *Potassium permanganate test.*—5 drops of a 1% potassium permanganate solution are added to a mixture of 5 cm.$^3$ of glycerin and 10 cm.$^3$ of distilled water. The decoloration of the permanganate must not be evident before 30 seconds.

(2) *Heat test.*—30 g. of glycerin are heated to 250° C. and maintained at this temperature for 2 hours. After cooling down, part of this glycerin is transferred into a coloration test tube of a photo-colorimeter type "Electrosynthesis." Another tube is filled with distilled water to serve as a standard sample. The photo-colorimeter is set to 50 with the standard sample tube containing distilled water. This tube is then substituted by the one filled with glycerin and one notes the indication of a microammeter, utilizing different filters: colorless, red, yellow, green, blue, violet. The glycerin is considered to be satisfactory if none of the readings is lower than 40.

EXAMPLE

| Filters | Colorless | Red | Yellow | Green | Blue | Violet |
|---|---|---|---|---|---|---|
| Standard sample (distilled water) | 50 | 50 | 50 | 50 | 50 | 50 |
| Glycerin A | 49 | 50 | 49.5 | 48.5 | 46 | 41 |
| Glycerin B | 48 | 50 | 49 | 45 | 35 | 31 |

The glycerin A shows a sufficient heat stability. The glycerin B shows an insufficient heat stability.

(3) *Sulphuric acid test.*—5 cm.$^3$ of glycerin and 5 cm.$^3$ of sulphuric acid are vigorously agitated for 1 minute in a 25 cm.$^3$ glass cylinder closed by a glass stopper. After a pause of 1 hour, the coloration of the mixture must not be darker than that of a standard sample liquid obtained by mixing 0.2 part of a cobaltous chloride solution containing 59.5 mg. of $CoCl_2 \cdot 6H_2O$ per cm.$^3$, 1.5 parts of ferric chloride containing 45.0 mg. of $FeCl_3 \cdot 6H_2O$ per cm.$^3$, and 3.3 parts of water.

Synthetic glycerin does not comply with the requirements of quality characterized by the above described tests.

This is due to the presence of small quantities of impurities, produced by secondary reactions during the synthesis, which cannot be eliminated completely in the course of the normal concentration and distillation processes. In fact, it is known that during the synthesis, part of the allylalcohol is oxidized to acrolein and that this latter is likely to lead, due to its great reactivity, to aldehydic products of feeble volatility, by addition of water or of alcohols on its double linking, and to acetals with the allylalcohol and with the glycerin. A certain part of these numerous by-products of reaction possesses a volatility near to that of the glycerin and consequently is again present in this latter after distillation. The analysis of this synthetic glycerin actually detects the presence of ethylenic and aldehydic groups, the major part of these latter being blocked in the state of acetals.

Usually suggested processes for the purification of the natural glycerins or of glycerin obtained from chlorohydrins, i.e. the treatments by adsorption agents (activated earth, active carbons), by extraction solvents, by acids or bases, by ion exchanging resins, although being frequently sufficient for obtaining a product meeting the requirements of current applications, are not at all efficient to obtain a glycerin of high pureness which must comply with rigorous quality standards like those described above.

It was also suggested to submit impure glycerins to a catalytic hydrogenation process in order to make them acceptable according to the potassium permanganate test. This result is indeed obtained with the synthetic glycerin, but no improvement at all is observed as to its stability against heat or as to the concentrated sulphuric acid test.

On the other hand, it was suggested to avoid the formation of by-products of acrolein, the presence of which is revealed by the concentrated sulphuric acid test, by eliminating the acrolein during the synthesis, before the complete hydrolysis of the glycidol into glycerin. Unfortunately, this operation does not allow one to obtain a glycerin which would be stable as to permanganate and heat tests, probably because the elimination of impurities is incomplete.

The object of the present invention concerns a process for the purification of synthetic glycerin, permitting one to obtain a high purity glycerin complying with all requirements of the users. The process essentially conists in submitting glycerin to a catalytic hydrogenation, in the presence of an acid agent.

It was absolutely surprising to obtain by this sole and simple treatment a perfectly pure glycerin, since hydrogenation in itself, carried out without an acid agent, brings only an improvement as to the potassium permanganate test. It is the more surprising because an acid treatment, before or after a hydrogenation in neutral medium, according to the method already known, provides no improvement at all in the results obtained by the potassium permanganate test.

The process may use the conventional hydrogenation catalysts, i.e., for instance, and this enumeration being not at all limitative, the Raney nickel or cobalt, reduced nickel, copper chromite, platinum or palladium. However, superior results are obtained with ruthenium, which is more active and permits one to reduce the importance of one or several factors of the reaction: quantity of catalyst, pressure, temperature, time of processing. The ruthenium is moreover characterized by a particularly high stability of its activity over a period of time.

When operating by discontinuous charges, it is generally not necessary to use more than 10 to 20% by weight of the catalyst in relation to the glycerin. When the process is carried out as a continuous one with, e.g. a stationary bed of a supported catalyst, the percentage of catalyst based on the quantity of glycerin treated per hour, may be higher, if one desires to reduce the reaction temperature or pressure.

The purification is carried out under hydrogen atmosphere. Although it is possible to work under atmospheric pressure, the use of a higher pressure ranging between 5 and 200 atmospheres, preferably 20 to 50 atmospheres, allows one to cut down substantially the time of treatment. It must be noticed that the role of the hydrogen is limited to the reduction of the impurities of the glycerin, which are generally present in very small quantities, and that the hydrogen consumption is therefore very low compared to the quantity of glycerin treated.

In the case of ruthenium as catalyzer, the preferred range of pressure is between 2 and 20 atmospheres in place of 20 to 50 atmospheres for the other catalyzers.

During the processing, the temperature is comprised between 20 to 200° C., preferably between 50 and 150° C.

The duration of the treatment may vary considerably in function of the other conditions chosen; it generally lies between 12 minutes and 4 hours.

The acid agent utilized according to the process of the invention may be chosen amongst the strong mineral or organic acids, such as the sulphuric, phosphoric, hydrochloric, para-toluene sulphonic, oxalic, etc. acids. The needed quantity ranges between 0.01% and 5% by weight of the glycerin.

According to a complementary characteristic of the invention, one can also utilize cationic resins in their acid form. Their use presents appreciable advantages: corrosion of the catalyst is avoided if this latter is, for example, composed of nickel, as well as a possible degradation of the glycerin; furthermore, it is not necessary to neutralize the glycerin after the hydrogenation process. All known cationic resins may be utilized, e.g., the Dowex 50, the Amberlite IR–120, etc., at the rate of 1 to 50% by weight of the glycerin. Each of these resins is a cationic strongly acid resin formed by a chain of aromatic hydrocarbons of tridimensional structure comprising as active cationic groups nuclear sulfonic acids. Care must be taken not to exceed the temperature allowed for the use of these resins, which is of the order of 110° C. Since the role of the resin is only to create acid conditions and since there is no ion exchange, there is practically no need to proceed to subsequent regeneration operations on these resins. The applicants have established that generally the resin undergoes a slight swelling, due to the absorption of some glycerin, which is not detrimental to its activity nor to its stability with time.

The process is preferably carried out on a glycerin already cleared by distillation from the by-products of the synthesis reaction, but which still contains, as was mentioned, traces of impurities.

The hydrogenation treatment may also be effected before the distillation of the glycerin, i.e., on the crude synthesis solution, preferably free from the catalyst and from the excess of allylalcohol, or at any stage of concentration of this solution. The results are equally satisfactory under these conditions, provided that the subsequent distillation process does not introduce new impurities which may develop for instance by degradation of the glycerin at too high temperature.

One may operate on the glycerin such as it is or diluted by a small quantity of water which may range from 5 to 30% by weight. After processing, the glycerin according to the invention is perfectly colorless and inodorous and it is sufficient, after a possible neutralization of the acid catalyst by passing over an anionic resin, to concentrate it by evaporating the water to the required strength, and possibly to eliminate a small fraction of light components. Then the glycerin goes successfully through all the tests for commercial quality, mentioned above.

It is also possible to operate in the presence of an organic solvent of the glycerin, for example an alcohol, but generally this does not procure any particular advantage.

The following non-limitative examples of purification are illustrative of the results obtained by the process according to the invention.

The results of these examples are classified in the following table.

TABLE

| | Color | Odor | KMnO$_4$ test | H$_2$SO$_4$ test | Heat Test |  |  |  |  |  |
|---|---|---|---|---|---|---|---|---|---|---|
| | | | | | Readings of the colorimeter with the following filters: | | | | | |
| | | | | | Colorless | Red | Yellow | Green | Blue | Violet |
| Requirements of the tests | Colorless | Inodorous | >30 sec | Clearer than the standard sample liquid. | >40 | >40 | >40 | >40 | >40 | >40 |
| Distilled glycerin non-purified. | Yellow | Pronounced | <1 sec | Black; not good | The glycerin heated at 250° C. is black. | | | | | |
| Ex. 1: | | | | | | | | | | |
| Sample A | Colorless | Very slight odor. | 4 min | Slightly darker yellow than the sample liquid. | 47 | 50 | 49 | 47 | 43 | 42 |
| Sample B | ___do___ | Inodorous | 5 min | Good | 48 | 50 | 50 | 48 | 45 | 43 |
| Sample C | ___do___ | ___do___ | 2 min | Dark brown; not good | 44 | 48 | 47 | 43 | 38 | 33 |
| Sample D | ___do___ | Very slight odor. | 4 min | Darker yellow than the sample liquid. | 47 | 50 | 48 | 46 | 43 | 41 |
| Ex. 2: | | | | | | | | | | |
| Sample E | ___do___ | Inodorous | 6 min | Good | 48 | 50 | 50 | 48 | 46 | 44 |
| Ex. 3—Sample F | ___do___ | ___do___ | 3 min | ___do___ | 46 | 49 | 48 | 46 | 43 | 41 |
| Ex. 4—Sample G | ___do___ | ___do___ | 6 min | ___do___ | 48 | 50 | 49 | 47 | 45 | 43 |
| Ex. 5—Sample H | ___do___ | ___do___ | 5 min | ___do___ | 48 | 50 | 50 | 49 | 47 | 45 |

*Example 1*

300 g. of distilled glycerin, obtained by reaction of hydrogen peroxide on allylalcohol in the presence of tungstic acid, were introduced into a stainless steel autoclave of 1 liter capacity, together with 60 g. of water, 10 g. of Raney nickel, 50 g. of "Dowex 50" resin. The mixture was heated for 2 hours at 110° C. under 50 atmospheres of hydrogen.

After cooling down, the catalyst and the resin were separated by filtration and one obtained a colorless solution which, after ordinary evaporation of the water, represented a glycerin already practically pure (sample A) as is shown in the table. After eliminating a small head fraction, its purity was still further improved (sample B).

For comparison, the operation was repeated, but without ion exchange resin addition. As is seen from the table (sample C), the improvement of quality was only very partial, even after removing of the upper fraction.

*Example 2*

The purification was carried out as in Example 1, but the acid resin was replaced by 0.4 g. of concentrated sulphuric acid and one operated for 1 hour at 150° C. After hydrogenation, the solution was freed of the nickel by filtration and of the sulphuric acid by passing over subsequent beds of "Dowex I" and "Dowex 50" resins. After concentration (sample D) and elimination of the head fraction (sample E), the obtained glycerin was of the same high quality as the samples A and B of Example 1.

"Dowex I" resin is a strongly basic anionic resin formed by a styrene-divinylbenzene copolymer comprising quaternary ammonium groups.

Example 3

The procedure was the same as in the Example 1, but the glycerin used was the crude product, concentrated at 80% and free from tungstic acid. It contained, therefore, heavier and lighter components than itself.

After hydrogenation and elimination of the catalyst and the resin by filtration, the purified glycerinous solution was concentrated and distilled under reduced pressure. A head fraction was eliminated corresponding to the lighter products than the glycerin. The next fraction (sample F) was constituted by glycerin of high purity. The heavier products coming from the synthesis remained at the bottom of the column.

Example 4

300 g. of the same glycerin as that used in the Example 1 were brought into a one liter autoclave together with 30 g. of water, 0.4 g. of concentrated sulphuric acid and 30 g. of a catalyst constituted of palladium deposited at the rate of 5% by weight on cocoanut charcoal. The mixture was heated for 1½ hours at 130° C. under 50 atmospheres of hydrogen, then the glycerin was separated as in Example 2.

The thus obtained glycerin (sample G) showed the same high quality as that of Example 2.

Example 5

A pressure resistant tube containing a mixture of a platinum catalyst deposited on charcoal and of "Dowex 50" resin was continuously fed by a solution of distilled glycerin identical with that used in Example 1. The time of stay was 2 hours and 30 minutes, the temperature was 110° C., and the hydrogen pressure, 30 atmospheres. The glycerin (sample H) obtained after concentration and elimination of the head fraction showed the same high purity as the batchwise purified glycerin.

Example 6

A solution of 1000 g. of distilled glycerin and 200 g. of water was broght into a stainless steel autoclave of a capacity of 3 liters together with 20 g. of a catalyst constituted by ruthenium deposited at the rate of 5% by weight on active carbon and 100 g. of "Dowex 50" resin.

The mixture was heated for 1 hour and 30 minutes at 110° C., under 10 atmospheres of hydrogen. After cooling down, separation of the catalyst by filtering and elimination of the head fraction, the obtained glycerin was of a high degree of purity, as is shown by the results of the following tests.

Tests:
```
Color _____ Colorless.
Odor _____ Inodorous.
Stability to potassium perman-
  ganate _____ 4 minutes.
Stability to H2SO4 _____ Very pale yellow;
                               good.
Stability to heat _____ Practically color-
                               less.
Readings on the colorimeter with
  filter—
    Colorless _____ 48.
    Red _____ 50.
    Yellow _____ 50.
    Green _____ 49.
    Blue _____ 47.
    Violet _____ 45.
```

Example 7

One fed a pressure resistant reactor, containing 100 g. of a catalyst constituted by ruthenium deposited at the rate of 5% by weight on active carbon and 300 g. of "Dowex 50" resin, with a solution of glycerin identical to that used in Example 1. The rate of flow was 5 l./h., the time of stay was 1 hour, the temperature 110° C., and the hydrogen pressure was 20 atmospheres. After concentrating and eliminating the head fraction, the glycerin showed the same high purity as that prepared non-continuously. After 400 h. of operation, there was neither a reduction of catalyst activity nor a decline of quality of the glycerin.

We claim:

1. A process for purifying synthetic glycerin obtained by catalytic reaction of allylalcohol and hydrogen peroxide comprising subjecting said synthetic glycerin to catalytic hydrogenation in the presence of a hydrogenation catalyst and of an acid agent selected from the group consisting of sulphuric acid, hydrochloric acid, phosphoric acid, paratoluene sulphonic acid and oxalic acid and a cationic resin in its acid form and separating said acid agent and said hydrogenation catalyst from said glycerin, said sulphuric acid, hydrochloric acid, phosphoric acid, para-toluene sulphonic acid and oxalic acid being used in amounts of 0.1% to 5% by weight of said glycerin, and said cationic resin being used in amounts of 1% to 50% by weight of said glycerin, said catalytic hydrogenation being carried out at a temperature between 20° C. and 200° C. and at a pressure between 0 and 200 atmospheres.

2. The process of claim 1 characterized by the catalyst for said catalytic hydrogenation being selected from the group consisting of Raney nickel, Raney cobalt, reduced nickel, copper chromite, platinum, palladium and ruthenium.

3. The process of claim 1 characterized by the catalyst for said catalytic hydrogenation being ruthenium.

4. A process according to claim 1, wherein the catalytic hydrogenation is carried out at a pressure between 20 and 50 atmospheres.

5. A process according to claim 1, wherein the catalytic hydrogenation is carried out in the presence of a quantity of water amounting to 5 to 30% by weight of the glycerin.

6. A process according to claim 1, wherein the catalytic hydrogenation is carried out at a temperature between 50 and 150° C.

References Cited by the Examiner

UNITED STATES PATENTS

| | | | |
|---|---|---|---|
| 654,023 | 7/1900 | Roch | 260—637 |
| 2,381,055 | 5/1943 | Hoyt | 260—637 |
| 2,768,214 | 10/1956 | McKinley et al. | 260—637 |

LEON ZITVER, *Primary Examiner.*

M. B. ROBERTO, J. E. EVANS, *Assistant Examiners.*